(12) United States Patent
Brakes

(10) Patent No.: US 9,862,480 B2
(45) Date of Patent: Jan. 9, 2018

(54) AERODYNAMIC DEVICE

(71) Applicant: AIRBUS OPERATIONS LIMITED, Bristol (GB)

(72) Inventor: David Brakes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 238 days.

(21) Appl. No.: 14/645,690

(22) Filed: Mar. 12, 2015

(65) Prior Publication Data

US 2015/0259061 A1 Sep. 17, 2015

(30) Foreign Application Priority Data

Mar. 12, 2014 (GB) .................................. 1404397.0

(51) Int. Cl.
| | | |
|---|---|---|
| *B64C 9/00* | (2006.01) | |
| *B64C 3/38* | (2006.01) | |
| *B64C 3/50* | (2006.01) | |

(52) U.S. Cl.
CPC .................. *B64C 9/00* (2013.01); *B64C 3/38* (2013.01); *B64C 3/50* (2013.01); *Y02T 50/44* (2013.01)

(58) Field of Classification Search
CPC .... B64C 3/52; B64C 3/50; B64C 3/48; B64C 3/44; B64C 3/38; B64C 9/00
See application file for complete search history.

(56) References Cited

U.S. PATENT DOCUMENTS

| | | | | |
|---|---|---|---|---|
| 2,973,925 | A * | 3/1961 | Wiele ........................ | B64C 9/24 244/203 |
| 6,244,542 | B1 * | 6/2001 | Young ....................... | B64C 3/50 244/213 |
| 6,869,050 | B1 * | 3/2005 | Burchard .................. | B64C 9/00 244/123.8 |
| 8,317,479 | B2 * | 11/2012 | Vronsky ............... | F03D 1/0641 416/196 A |
| 9,315,256 | B2 * | 4/2016 | Maenz ....................... | B64C 9/02 |
| 2011/0293420 | A1 * | 12/2011 | Hancock ............... | F03D 1/0641 416/23 |
| 2012/0224964 | A1 * | 9/2012 | Clark ........................ | B64C 9/02 416/23 |
| 2014/0356181 | A1 * | 12/2014 | Mailly .................. | F03D 1/0641 416/229 A |

FOREIGN PATENT DOCUMENTS

| | | |
|---|---|---|
| EP | 2842867 A1 | 3/2015 |
| GB | 2010761 A | 7/1979 |
| WO | 2013124397 A1 | 8/2013 |

\* cited by examiner

*Primary Examiner* — Richard R Green
(74) *Attorney, Agent, or Firm* — Hauptman Ham, LLP

(57) ABSTRACT

The invention provides an aerodynamic device configured for being mounted to an aerodynamic structure of an aircraft, the aerodynamic device having a spanwise length, a chordwise width, a leading edge section along a leading edge of the device, for being mounted to the aerodynamic structure of the aircraft, and a trailing edge section along a trailing edge of the device, for providing a required aerodynamic profile, wherein a first chordwise extending segment of the trailing edge section is moveable in a spanwise direction with respect to the leading edge section or with respect to a second chordwise extending segment of the trailing edge section.

24 Claims, 12 Drawing Sheets

AERODYNAMIC DEVICE

RELATED APPLICATIONS

The present application claims priority of Great Britain Application Number 1404397.0, filed Mar. 12, 2014, the disclosure of which is hereby incorporated by reference herein in its entirety.

BACKGROUND OF THE INVENTION

The present invention concerns aerodynamic devices, such as slats, ailerons, elevators, spoilers, flaps, Krueger flaps and rudders. More particularly, but not exclusively, this invention concerns aerodynamic devices for being rotatably mounted to an aerodynamic structure, such as a wing, horizontal tailplane or vertical tailplane, of an aircraft, the aerodynamic device having a spanwise length, a chordwise width, a leading edge section along a leading edge of the device, for being rotatably mounted to the aerodynamic structure of the aircraft, and a trailing edge section along a trailing edge of the device, for providing a required aerodynamic profile. The invention also concerns an aircraft comprising such an aerodynamic device.

Typical aircraft wings for passenger aircraft are provided with a number of slats. These slats are rotatably mounted along the leading edge of the wing. When stowed, they are positioned adjacent to the wing leading edge and in line with the wing. When deployed, they translate forwards away from the leading edge of the wing and rotate downwards away from the wing. The slats effectively increase the area of the wing and provide additional lift to the wing.

FIG. 1a shows a spanwise end view of a typical wing assembly 100. The wing assembly 100 comprises wing primary structure 110, a leading edge device 120 (located at the leading edge of the wing primary structure 110) and a trailing edge device 130 (located at the trailing edge of the wing primary structure 110). The leading edge device 120 is a slat. The trailing edge device 130 is a flap. The wing primary structure 110 has a chordwise minor axis 111, extending through the centre of the structure 110. The minor axis 111 is the axis about which the out-of-plane spanwise bending stiffness is at a minimum and the axis about which out-of-plane spanwise bending takes place.

FIG. 1b shows a schematic perspective view of the slat 120 of FIG. 1a. The slat 120 comprises a leading edge D-nose section 122 at the leading edge of the structure and a wedge shaped trailing edge section 123. The axes show the spanwise direction 124 extending along the length of the slat, the chordwise direction 125 extending along the width of the slat and the out-of-plane direction 126 extending upwards away from the slat 120. Equivalent directions (spanwise, chordwise, out-of-plane) also apply for a trailing edge device 130 or any other kind of leading edge device.

In the stowed configuration of FIG. 1a, the minor bending axes of the slat 120 (and flap 130) are substantially the same as the minor bending axis 111 of the wing primary structure 110. Hence, when stowed, the entirety of the slat 120 (and flap 130) are close to the minor bending axis 111 of the wing primary structure 110.

If the slat (and flap 130) are mounted to the wing primary structure 110 by more than two supports (e.g. slat tracks), the slat (and flap 130) are coupled to the wing primary structure 110 deformations and are forced to sympathetically bend with the wing primary structure 110 about an axis parallel to the wing primary structure 110 minor axis 111. When the wing primary structure 110 bends up and down (out-of-plane spanwise bending) and the coupled slat 120 (and coupled flap 130) are forced to sympathetically bend with it, the slat (and flap) experience out-of-plane spanwise bending 137 (up and down about the minor axis 111—see FIG. 2c) and the stress level in the device is relatively low. The slat (and flap) also experience this out-of-plane spanwise bending due to out-of-plane aerodynamic load (lift).

FIG. 2a shows a spanwise end view of the wing assembly 100 of FIG. 1a with slat 120 and flap 130 deployed. Here it can be seen that the wing primary structure 110 has the same minor axis (about which the out-of-plane spanwise bending stiffness is at a minimum) 111, about which it bends. The leading edge device 120 and the trailing edge device 130 are shown with forced bending axes 121, 131 marked on them. These axes 121, 131 run through the centroid of the devices and are parallel to the minor axis 111 of the wing primary structure 110. If coupled to the wing primary structure 110, the leading edge device 120 and trailing edge device 130 are forced to bend about these axes 121, 131 respectively during out-of-plane spanwise bending of the wing primary structure 110.

The stress level during wing bending is determined by the distance from the bending axis and the stiffness of the material. As can be seen from the stress representations 140, 150 of the leading edge device 120 and trailing edge device 130, respectively, the maximum stress on the devices 120, 130 is increased due to the increased distance of the extremities of the devices from the forced bending axes 121, 131.

Also, as the minor bending axes of the slat 120 (and flap 130) are rotated, when the wing bends up and down and the coupled slat 120 (and coupled flap 130) are forced to sympathetically bend with it, the slat 120 (and flap 130) experience out-of-plane spanwise bending 127 (up and down about the slat/flap minor axis 127a—see FIG. 2c) and also in-plane bending 128 (forwards and backwards about the slat/flap major axis 128a—see FIG. 2d). The slat (and flap) also experience this in-plane bending due to chordwise aerodynamic load (drag).

It should be noted that a slat (and flap) typically also experiences out-of-plane chordwise bending 129, about a mid-principal axis 129a (perpendicular to both major axis 128a and minor axis 127a), as shown in FIG. 2f. Bending about this axis 129a is induced by an out-of-plane aerodynamic load (lift) and is the method by which the slat (or flap) trailing edge section 123 carries the aerodynamic load forward to the leading edge section 122.

FIG. 2e shows a schematic plan view of the slat 120 of FIG. 1b, showing the in-plane bending. Here, it can be seen that the slat 120 (including a leading edge section 122 and a trailing edge section 123) bends about major axis 128a (the axis about which in-plane bending occurs), perpendicular to the minor axis 127a (the axis about which out-of-plane spanwise bending occurs).

The devices are much stiffer in in-plane bending and so this puts high loads on the mounting points to the wing primary structure 110 and generates large stresses. As well as generating large loads and stresses, this can also lead to undesirable deflection and/or distortion of the slat 120 itself.

Hence, for a typical aircraft, a slat (or other aerodynamic device) is only mounted to the wing at two support points (e.g. slat tracks) so as to allow the slat to be decoupled from wing bending. If only using two support points for the slat, this means that the slat has to be stiff and strong enough to support the aerodynamic load between the two supports. Making a stiffer and stronger slat incurs a weight penalty (as the slat needs to be heavier in order to be stiffer and stronger). This puts an effective limit on the length of the slat. Hence, in order to provide additional lift over the required length of the wing, an aircraft wing is typically provided with a number of slats along its length. This results in a high part count for the wing, resulting in cost and complexity in design and manufacture.

FIG. 2b shows an aft view of a typical wing assembly in an upwardly bent position. Here, the wing assembly 100 comprises four deployed slats 120a, 120b, 120c, 120d, each attached to the wing primary structure 110 by two slat tracks; inboard track 120e and outboard track 120f. This Figure also shows the wing assembly undeformed position 112 (in dashed lines) and the upwardly bent position due to out-of-plane spanwise bending 113.

Instead of, or in addition to, limiting the length of the slat, another way of dealing with the issue is to limit the deployment angle of the slat. However, this is also undesirable as it means the slat may not be effective, or as effective, over the whole flight envelope.

Another solution is to structurally reinforce the slat. However, again, this also has disadvantages as the reinforcement adds weight and complexity.

The present invention seeks to mitigate the above-mentioned problems. Alternatively or additionally, the present invention seeks to provide an improved aerodynamic device.

SUMMARY OF THE INVENTION

The present invention provides, according to a first aspect, an aerodynamic device configured for being mounted to an aerodynamic structure of an aircraft, the aerodynamic device having a spanwise length, a chordwise width, a leading edge section along a leading edge of the device, for being mounted to the aerodynamic structure of the aircraft, and a trailing edge section along a trailing edge of the device, for providing a required aerodynamic profile, wherein a first chordwise extending segment of the trailing edge section is moveable in a spanwise direction with respect to the leading edge section or with respect to a second chordwise extending segment of the trailing edge section.

An aerodynamic device provides an aerodynamic surface in addition to a primary aerodynamic surface of the aerodynamic structure. The aerodynamic device therefore comprises an aerodynamic (smooth) surface supported by a support structure, if required. This support structure is typically internal to the aerodynamic device (for example, sandwiched between two oppositely facing external aerodynamic surfaces) or on an opposite side to the aerodynamic (smooth) surface. The aerodynamic device may also comprise attachors or attachment means for mounting/attaching the aerodynamic device to the aerodynamic structure.

Having a first chordwise extending segment of the trailing edge section that is moveable in a spanwise direction with respect to the leading edge section or with respect to a second chordwise extending segment of the trailing edge section allows the segment to be decoupled from the leading edge section. This means, during in-plane bending, that it can bend about its own major bending axis. This reduces the in-plane bending stiffness of the segment. and therefore the trailing edge section and the device as a whole. The in-plane stiffness of the device may be reduced by more than half. Hence, when the device is deployed, the bending loads on the device are reduced. This allows the device to be supported by multiple support points (e.g. slat tracks). Hence, the device can be longer than it would be otherwise. This means that fewer devices are needed. For example, a single slat could be used to provide additional lift over the length of a wing.

Preferably, the aerodynamic device is for being rotatably mounted and/or translationally mounted to the aerodynamic structure of the aircraft.

Preferably, the trailing edge section comprises one or more slots extending chordwise from the trailing edge of the device, thus defining two or more chordwise extending segments along the spanwise length of the trailing edge section. Having chordwise slots means that load is prevented from building up in the spanwise direction in the trailing edge section. If the trailing edge section cannot carry significant spanwise load then it will not contribute significantly to the in-plane bending stiffness. In the extreme, the leading edge section will bend about its own bending axis, as if the trailing edge were not there. This reduces the in-plane bending stiffness of the device.

Preferably, the one or more slots open and close during in-plane bending of the device. This means that the width of the slots gets larger and smaller during in-plane bending. It does not require that the slots fully close so that the segments abut each other.

Preferably, the slots are aerodynamically sealed such that the required aerodynamic profile is maintained.

More preferably, the aerodynamic sealing comprises covering the slots or filling the slots with a flexible, (preferably resilient) material, such as rubber.

Preferably, the trailing edge section comprises at least two chordwise extending segments, each segment being independently attached to the leading edge section. Having separate chordwise extending segments means that load is prevented from building up in the spanwise direction in the trailing edge section. If the trailing edge section cannot carry significant spanwise load then it will not contribute significantly to the in-plane bending stiffness. In the extreme, the leading edge section will bend about its own bending axis, as if the trailing edge were not there. This reduces the in-plane bending stiffness of the device.

More preferably, the segments move spanwise with respect to each other during in-plane bending of the device.

Preferably, the segments are aerodynamically sealed to each other such that the required aerodynamic profile is maintained.

More preferably, the aerodynamic sealing comprises seals, such as telescopic seals, blade seals or flexible seals between the segments. The flexible seals may be made of a resilient material, such as rubber.

Preferably, the aerodynamic sealing comprises interleaving of the seals/segments.

Preferably, the trailing edge section is slidably mounted to the leading edge section such that parts of the trailing edge section can move spanwise with respect to corresponding parts of the leading edge section.

Here, corresponding parts of the leading edge section means the point on the leading edge section that lines up in a spanwise direction to that point on the trailing edge section, when the device is in a natural, undeformed/unbent deployed state.

Having the trailing edge section slidably mounted to the leading edge section means that, during in-plane bending, while the leading edge of the trailing edge section is forced to match the curvature of the trailing edge of the leading edge section, these two adjacent edges are able to freely expand or contract in the spanwise direction relative to each other. Instead, if the trailing edge section was not slidably mounted to the leading edge section, the leading edge section and trailing edge section would bend in-plane as a single beam about a "combined" major axis. Having the trailing edge section slidably mounted to the leading edge section means that the leading edge section and the trailing edge section bend as separate beams about their own "individual" major axes. This reduces the overall in-plane bending stiffness of the device (to typically less than half).

Preferably, spanwise sliding between the trailing edge section and leading edge section is not permitted at a substantially mid-span point, by provision of a fixing between the trailing edge section and leading edge section at that point. This mid-span point does not have to be exactly mid-span. Instead, the point is simply there to fix the trailing edge section to the leading edge section so as to maintain the spanwise position of the trailing edge section. It is generally at a point where the trailing edge section would not naturally move spanwise with respect to the leading edge section during in-plane bending.

Preferably, the slidable mounting is provided by any of the following: swinging linkages, piano hinges, sliding bolts or a combination of these.

The present invention provides, according to a second aspect, an aerodynamic device configured for being mounted to an aerodynamic structure of an aircraft, the aerodynamic device having a spanwise length, a chordwise width, a leading edge section along a leading edge of the device, for being mounted to the aerodynamic structure of the aircraft, and a trailing edge section along a trailing edge of the device, for providing a required aerodynamic profile, wherein the trailing edge section comprises at least one skin component made of composite material, preferably a synthetic composite material, such as a carbon fibre composite material, wherein the component comprises a lay-up of directional fibre layers biased in the chordwise orientation.

An aerodynamic device provides an aerodynamic surface in addition to a primary aerodynamic surface of the aerodynamic structure. The aerodynamic device therefore comprises an aerodynamic (smooth) surface supported by a support structure, if required. This support structure is typically internal to the aerodynamic device (for example, sandwiched between two oppositely facing external aerodynamic surfaces) or on an opposite side to the aerodynamic (smooth) surface. The aerodynamic device may also comprise attachors or attachment means for mounting/attaching the aerodynamic device to the aerodynamic structure.

Having a chordwise fibre bias allows a sufficient out-of-plane chordwise bending stiffness to be achieved whilst (relatively) lowering the spanwise bending stiffness of the trailing edge section. The relative lowering of the out-of-plane spanwise bending stiffness of the trailing edge section (i.e. effectively removing spanwise orientated fibres) reduces the in-plane bending stiffness of the trailing edge section and the device as a whole. This is because in-plane bending stiffness is a measure of the resistance to compression/expansion, especially of the extremities of the device.

Having a sufficient out-of-plane chordwise bending stiffness along the trailing edge section enables the required aerodynamic profile of the trailing edge section to be maintained. It also allows the pressure loads on the trailing edge section to be transferred to the leading edge section and then along the leading edge section to the aerodynamic structure.

Having a relatively low in-plane bending stiffness on the trailing edge section reduces the in-plane bending stiffness of the device. Hence, if/when the device is deployed or is mounted away from the aerodynamic structure, the bending loads on the device are reduced. This allows the device to be supported by multiple support points (e.g. slat tracks). Hence, the device can be longer than it would be otherwise. This means that fewer devices are needed. For example, a single slat could be used to provide additional lift over the length of a wing.

The effect of this invention may be demonstrated by consideration of the bending stiffness of a typical slat. Modelled as an equivalent homogeneous beam, the typical slat may have an out-of-plane spanwise bending stiffness of $5.8 \times 10^6$ mm$^4$ and an in-plane bending stiffness of $47.3 \times 10^6$ mm$^4$. In the present invention, the out-of-plane spanwise bending stiffness of the trailing edge may be reduced by a factor of up to, say 10, to $5.8 \times 10^5$ mm$^4$. As result of modifying the trailing edge out-of-plane spanwise bending stiffness, the in-plane bending stiffness of the whole slat is reduced to $10.4 \times 10^6$ mm$^4$, nearly a five-fold decrease. The out-of-plane spanwise bending stiffness of the whole slat may be maintained by modifying the leading edge section, for example by increasing the stiffness of a D-nose boom in the leading edge section. The out-of-plane chordwise bending stiffness may be maintained or manipulated as an independent variable to the out-of-plane spanwise bending stiffness.

Having fibres biased in the chordwise orientation means that more and/or stiffer fibres are orientated towards the chordwise orientation than the spanwise orientation. For example, if 0 (and 180) degrees is considered the spanwise orientation and 90 (and 270) degrees is considered the chordwise orientation, then any fibres orientated between 315 degrees and 45 degrees are orientated towards the spanwise orientation and any fibres orientated between 45 degrees and 135 degrees are orientated towards the chordwise orientation. If the lay-up is biased in the chordwise orientation, there may be more fibres orientated in the chordwise orientation and/or the fibres orientated in the chordwise orientation are stiffer than those orientated towards the spanwise orientation and/or more or stiffer fibres are (more closely) orientated towards the chordwise orientation than to the spanwise orientation. As a result, the total stiffness of the fibres in the chordwise orientation (provided by the fibres orientated towards the chordwise orientation) will be more than the total stiffness of the fibres in the spanwise orientation (provided by the fibres orientated towards the spanwise orientation).

Here, the trailing edge section is anisotropic. I.e. it has different bending properties in different directions.

Preferably, the aerodynamic device is for being rotatably mounted and/or translationally mounted to the aerodynamic structure of the aircraft.

More preferably, the trailing edge section comprises two skin components sandwiching a core material and wherein at least one skin component comprises a lay-up of directional fibre layers biased in the chordwise orientation.

Even more preferably, both skin components comprise a lay-up of directional fibre layers biased in the chordwise orientation.

Preferably, the core material is anisotropic (i.e. the core material has a higher out-of-plane chordwise bending stiffness, than its out-of-plane spanwise bending stiffness for an equally dimensioned geometry), for example a honeycomb structure.

The present invention provides, according to a third aspect, an aerodynamic device configured for being mounted to an aerodynamic structure of an aircraft, the aerodynamic device having a spanwise length, a chordwise width, a leading edge section along a leading edge of the device, for being mounted to the aerodynamic structure of the aircraft, and a trailing edge section along a trailing edge of the device, for providing a required aerodynamic profile, wherein the trailing edge section comprises at least one skin component, wherein the skin component comprises a corrugated panel and wherein corrugations of the corrugated panel extend in the chordwise orientation.

An aerodynamic device provides an aerodynamic surface in addition to a primary aerodynamic surface of the aerodynamic structure. The aerodynamic device therefore comprises an aerodynamic (smooth) surface supported by a support structure, if required. This support structure is typically internal to the aerodynamic device (for example, sandwiched between two oppositely facing external aerodynamic surfaces) or on an opposite side to the aerodynamic (smooth) surface. The aerodynamic device may also comprise attachors or attachment means for mounting/attaching the aerodynamic device to the aerodynamic structure.

Having corrugations of the corrugated panel extend in the chordwise orientation allows a sufficient out-of-plane chordwise bending stiffness to be achieved whilst (relatively) lowering the spanwise bending stiffness of the trailing edge section. The relative lowering of the out-of-plane spanwise bending stiffness of the trailing edge section reduces the in-plane bending stiffness of the trailing edge section and the device as a whole. This is because in-plane bending stiffness is a measure of the resistance to compression/expansion, especially of the extremities of the device.

Having a sufficient out-of-plane chordwise bending stiffness along the trailing edge section enables the required aerodynamic profile of the trailing edge section to be maintained. It also allows the pressure loads on the trailing edge section to be transferred to the leading edge section and then along the leading edge section to the aerodynamic structure.

Having a relatively low in-plane bending stiffness on the trailing edge section reduces the in-plane bending stiffness of the device. Hence, if/when the device is deployed or is mounted away from the aerodynamic structure, the bending loads on the device are reduced. This allows the device to be supported by multiple support points (e.g. slat tracks). Hence, the device can be longer than it would be otherwise. This means that fewer devices are needed. For example, a single slat could be used to provide additional lift over the length of a wing.

The corrugations may be sufficiently small so as to reduce any adverse effects on aerodynamics.

Preferably, the trailing edge section comprises two skin components sandwiching a core material and wherein at least one skin component comprises a corrugated panel and wherein corrugations of the corrugated panel extend in the chordwise orientation.

Preferably, the core material is anisotropic (i.e. the core material has a higher out-of-plane chordwise bending stiffness, than its out-of-plane spanwise bending stiffness for an equally dimensioned geometry), for example a honeycomb structure.

Preferably, the aerodynamic device is for being rotatably mounted and/or translationally mounted to the aerodynamic structure of the aircraft.

Preferably, the leading edge section comprises a D-nose structure.

Preferably, the device is made of composite material (preferably a synthetic composite material), such as a carbon fibre composite material, and/or a metallic alloy, such as aluminium alloy.

Preferably, the aerodynamic device is a leading edge or trailing edge device.

More preferably, the aerodynamic device is a slat, aileron, elevator, spoiler, flap, Krueger flap or rudder.

Preferably, the aerodynamic structure is a wing, horizontal tailplane or vertical tailplane.

In a particular embodiment, the aerodynamic device is a slat suitable for being rotatably mounted to a leading edge of a wing of an aircraft.

The invention also provides an aircraft wing comprising a slat according to the first, second or third aspects of the invention.

The invention also provides an aircraft comprising an aerodynamic device according to the first, second or third aspects of the invention and an aerodynamic structure, wherein the aerodynamic structure is a wing, horizontal tailplane or vertical tailplane.

The present invention is of greater application to larger commercial passenger aircraft although the present invention may also be applied to smaller aircraft. The aircraft is preferably heavier than 10 tonnes dry weight, more preferably heavier than 50 tonnes dry weight, and even more preferably heavier than 200 tonnes dry weight. The aircraft is preferably of a size equivalent to an aircraft designed to carry more than 40 passengers, and more preferably more than 100 passengers.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which:

FIG. 1b shows a schematic perspective view of the slat of FIG. 1a.

FIG. 12b shows a more detailed view of part of FIG. 12a;

DETAILED DESCRIPTION

Figure 3:
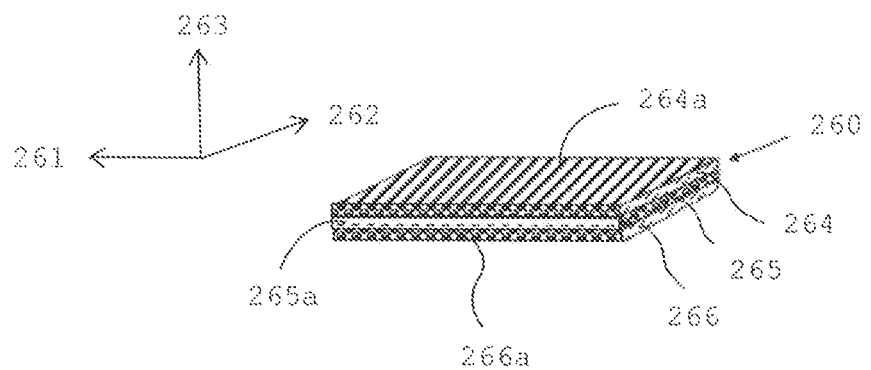
FIG. 3 shows a schematic perspective view of part of a skin sheet of a slat according to a first embodiment of the invention.

FIG. 3 shows a schematic perspective view of part of a skin sheet 260 of a trailing edge section of a slat according to a first embodiment of the invention. The axes shown on this Figure show a spanwise direction 261 extending along the length of the slat, a chordwise direction 262 extending along the width of the slat and an out-of-plane direction 263 extending upwards away from the slat.

The skin sheet 260 is part of a sandwich structure of the trailing edge section comprising a core sandwiched between two such skin sheets. The skin sheet 260 comprises a number of composite layers laid out one above the other in the out-of-plane 263 direction. The layers include a first lower layer 266, a second layer 265 and a third upper layer 264. Each layer comprises a number of carbon fibres, orientated in a particular direction. In the first layer 266, the fibres 266a are orientated substantially in the chordwise direction 262. In the second layer 265, the fibres 265a are orientated in the spanwise direction 261. In the third layer 264, the fibres 264a are orientated substantially in the chordwise direction 262, like in the first layer 266.

Hence, it can be seen that the fibres 264a, 265a, 266a of the skin sheet 260 are overall biased to be orientated in the chordwise direction 262. This means that the skin sheet is significantly stiffer in the chordwise direction 262 than the spanwise direction 261. The skin sheet 260, therefore, is anisotropic, i.e. it has different stiffness characteristics in the chordwise and spanwise directions.

The material used for the core is honeycomb and is also anisotropic, i.e. it has different stiffness characteristics in the chordwise and spanwise directions.

Figure 1A:
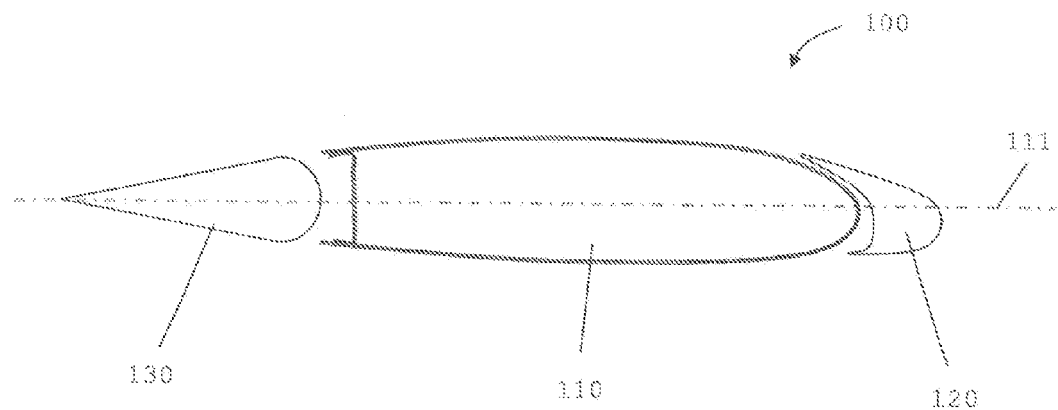
FIG. 1a shows a spanwise end view of a typical wing assembly, with slat and flap stowed.
Figure 1B:
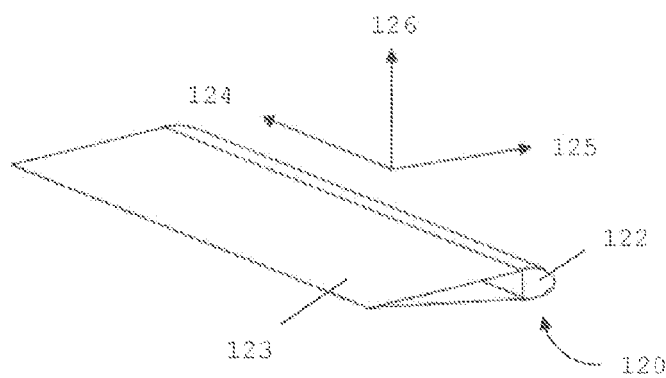

This means that the spanwise stiffness of the trailing edge section (123 in FIG. 1b) can be reduced, thereby reducing the in-plane bending stiffness of the slat, whilst maintaining the chordwise stiffness of the trailing edge section. This allows the trailing edge section to carry aerodynamic loads forwards to the stiffer leading edge section (122 in FIG. 1b). The leading edge section (not shown) may be in the form of a closed cell structure, such as a box beam. This structure also comprises hard points for supports and actuators for the slat. The leading edge structure can then carry the aerodynamic loads spanwise to the attachment points of the slat and then to the wing primary structure.

The stiffness ratio of out-of-plane chordwise to spanwise is approximately 2:1 with the following approximate lay-up of equal stiffness fibres: 44% of fibres in chordwise orientation, 12% of fibres in spanwise orientation and 44% of fibres in neutral orientation (i.e. at +/−45 degrees—equally between the spanwise and chordwise orientations).

In another embodiment, not shown, the stiffness ratio could approach, or even exceed 3:1, by using an even more chordwise biased lay-up.

Figure 4:
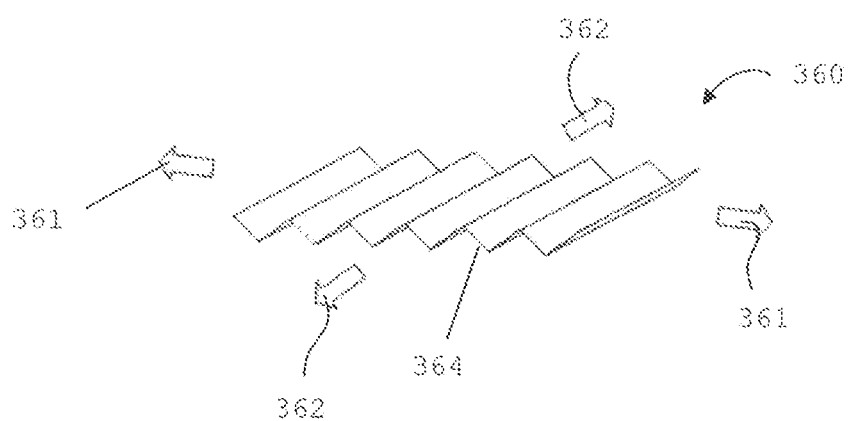
FIG. 4 shows a schematic perspective view of part of a skin sheet of a slat according to a second embodiment of the invention.

FIG. 4 shows a schematic perspective view of part of a skin sheet 360 of a trailing edge section of a slat according to a second embodiment of the invention. The directions shown on this Figure show a spanwise direction 361 extending along the length of the slat, and a chordwise direction 362 extending along the width of the slat.

The skin sheet 360 is part of a sandwich structure of the trailing edge section comprising a core sandwiched between two such skin sheets. The skin sheet 360 comprises a number of "zig-zag" corrugations 364, corrugated ("folded") in the spanwise direction 361 so as to create channels running in the chordwise direction 362. The skin sheet 360, therefore, is anisotropic, i.e. it has different stiffness characteristics in the chordwise and spanwise directions. The material used for the core is honeycomb and is also anisotropic, i.e. it has different stiffness characteristics in the chordwise and spanwise directions.

This means that the spanwise stiffness of the trailing edge section (123 in FIG. 1b) can be reduced, thereby reducing the in-plane bending stiffness of the slat, whilst maintaining the chordwise stiffness of the trailing edge section. This allows the trailing edge section to carry aerodynamic loads forwards to the stiffer leading edge section (122 in FIG. 1b). The leading edge section (not shown) may be in the form of a closed cell structure, such as a box beam. This structure also comprises hard points for supports and actuators for the slat. The leading edge structure can then carry the aerodynamic loads spanwise to the attachment points of the slat and then to the wing primary structure.

If the corrugations 364 are kept sufficiently small, any negative effect on the aerodynamics can be reduced.

Figure 5A:
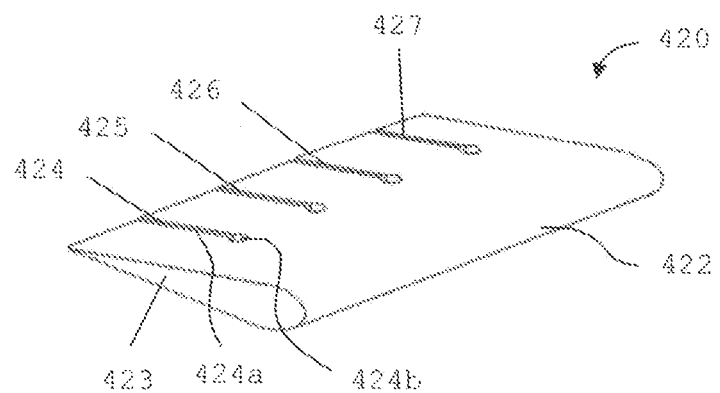
FIG. 5a shows a schematic perspective view of a slat according to a third embodiment of the invention.

FIG. 5a shows a schematic perspective view of a slat 420 according to a third embodiment of the invention. The slat 420 comprises a D-nose leading edge section 422 and a wedge shaped trailing edge section 423. The trailing edge section 423 is a sandwich structure with a core sandwiched between two skins. The trailing edge section 423 has four chordwise slots 424, 425, 425, 427 in it, effectively dividing the trailing edge portion of the trailing edge section 423 into 5 segments. Each slot extends though the height of the slat, from the trailing edge, chordwise to a forward location (but still within the trailing edge wedge section 423) of the slat. Each slot 424, 425, 426, 427 comprises an elongate section 424a extending chordwise from the trailing edge, ending in a rounded "nodule" 424b. The leading edge section 422 also comprises an attachment structure (not shown) for attaching the slat 420 to a wing primary structure.

Figure 5B:
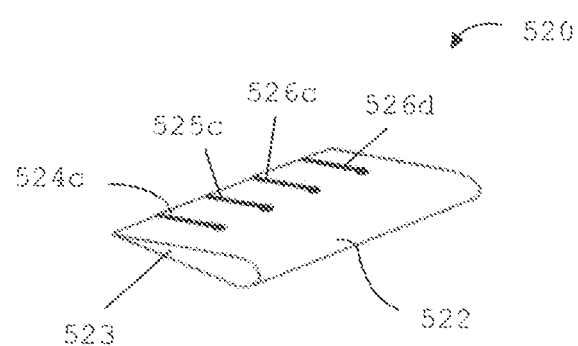
FIG. 5b shows a schematic perspective view of a slat according to a fourth embodiment of the invention.

FIG. 5b shows a schematic perspective view of a slat 520 according to a fourth embodiment of the invention. The slat 520 is very similar to slat 420 of FIG. 4 and comprises a D-nose leading edge section 522 and a wedge shaped trailing edge section 523. The trailing edge section 523 is a sandwich structure with a core sandwiched between two skins. The trailing edge section 523 has four chordwise slots 524, 525, 565, 527 in it, effectively dividing the trailing edge portion of the trailing edge section 523 into 5 segments.

Each slot extends though the height of the slat, from the trailing edge, chordwise to a location inboard (but still within the trailing edge wedge section 523) of the slat. Each slot 524, 525, 526, 527 comprises an elongate section (not labelled) extending chordwise from the trailing edge, ending in a rounded "nodule" (not labelled) inboard. The leading edge section 522 also comprises an attachment structure (not shown) for attaching the slat 520 to a wing primary structure. Each slot is also filled in with rubber 524c, 525c, 526c, 527c to maintain the aerodynamic surface of the slat 520.

In both embodiments (FIGS. 5a and 5b), the chordwise slots 424, 524 etc. prevent load from building up in the spanwise direction of the trailing edge section of the slat 420, 520. This is achieved by the (full or partial) opening and closing of the slots, as this provides the required extension and compression of the trailing edge section 423, 523 due to in-plane bending. This means that the trailing edge section will not contribute significantly to the major axis (in-plane) bending stiffness of the slat. In the extreme, the leading edge section 422, 522 will bend about its own major axis, as if the trailing edge section was not there. The leading edge section becomes the main spanwise beam of the slat whilst the trailing edge segments carry aerodynamic load forward to the leading edge section, whilst matching the leading edge section curvature. This reduces the overall major axis bending stiffness of the slat, as a whole.

Figure 6:
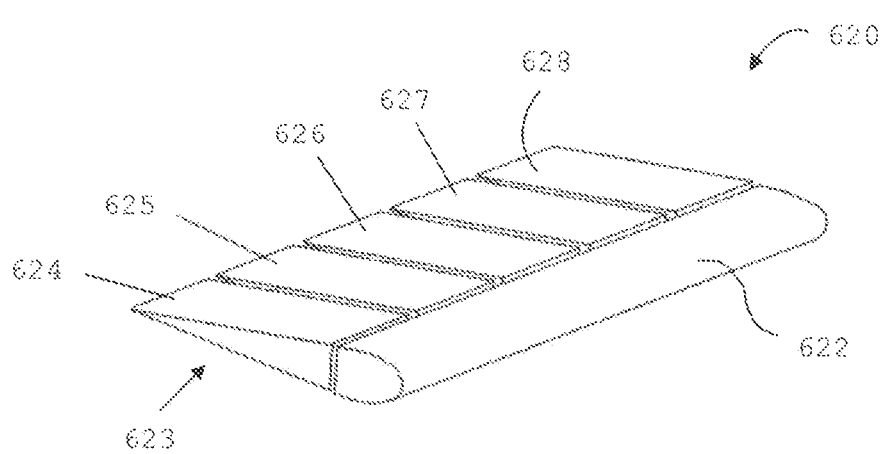
FIG. 6 shows a schematic perspective view of a slat according to a fifth embodiment of the invention.

FIG. 6 shows a schematic perspective view of a slat 620 according to a fifth embodiment of the invention. The slat 620 comprises a D-nose leading edge section 622 and a wedge shaped trailing edge section 623. The trailing edge section 623 has five spanwise separated segments 624, 625, 626, 627, 628, each separately, independently attached to the leading edge section 622. Each segment of the trailing edge section 623 is a sandwich structure with a core sandwiched between two skins. The leading edge section 622 also comprises an attachment structure (not shown) for attaching the slat 620 to a wing primary structure.

Figure 7:
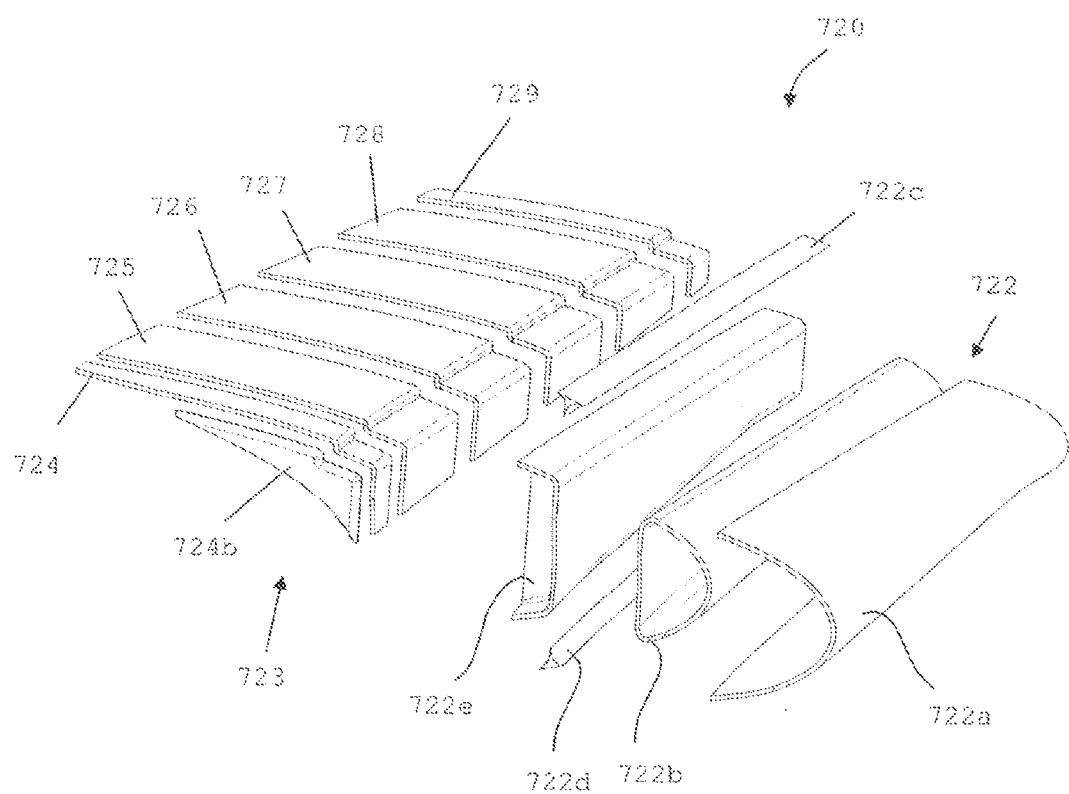
FIG. 7 shows a schematic exploded perspective view of a slat according to a sixth embodiment of the invention.

FIG. 7 shows a schematic exploded perspective view of a slat 720 according to a sixth embodiment of the invention. The slat 720 comprises a D-nose leading edge section 722 and a wedge shaped trailing edge section 723. The leading edge section 722 comprises a spanwise extending skin covering 722a in front of a D-shaped spanwise torque tube 722b. It also comprises a spanwise channel 722e in the shape of a backwards facing C, a spanwise top boom 722c in between the top of the channel 722e and the torque tube 722b and a spanwise bottom boom 722d in between the bottom of the channel 722e and the torque tube 722b. The top and bottom booms 722c, 722d carry end loads and provide bending stiffness to the leading edge section 722. The leading edge section 722 also comprises an attachment structure (not shown) for attaching the slat 720 to a wing primary structure.

The trailing edge section 723 has six spanwise separated segments 724, 725, 726, 727, 728, 729 each separately, independently attached to the leading edge section 722. Each segment of the trailing edge section 723 is a sandwich structure with a core sandwiched between two skins. Each segment of the trailing edge section 723 has a lower front end to accommodate the top flange of the channel 722e. The trailing edge section 723 also comprises an end stiffener 724b adjacent to the segment 724.

In both embodiments (FIGS. 6 and 7), the separate spanwise segments 624, 724 etc. prevent load from building up in the spanwise direction of the trailing edge section of the slat 620, 720. This is achieved by the relative spanwise movement of the segments with respect to each other, as this provides the required extension and compression of the trailing edge section 623, 723 due to in-plane bending. This means that the trailing edge section will not contribute significantly to the major axis bending stiffness. In the extreme, the leading edge section 622, 722 will bend about its own major axis, as if the trailing edge section was not there. The leading edge section becomes the main spanwise beam of the slat whilst the trailing edge segments carry aerodynamic load forward to the leading edge section, whilst matching the leading edge section curvature. This reduces the overall major axis bending stiffness of the slat, as a whole.

In both embodiments (FIGS. 6 and 7), the segments 624, 724 etc. could have seals between them to maintain the aerodynamic profile.

Figure 8A:
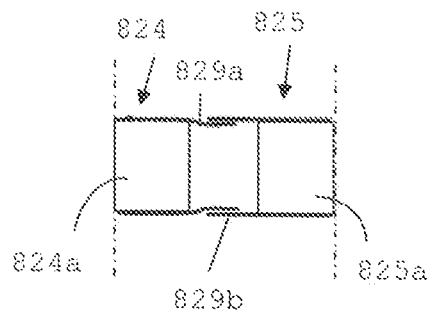
FIG. 8a shows a schematic aft view of a first sealing arrangement for use with the slat of FIG. 6 or 7.

FIG. 8a shows a schematic aft view of a telescopic sealing arrangement for use with the slat of FIG. 6 or 7. The figure shows a first trailing edge segment 824, comprising a core 824a, and a second trailing edge segment 825, also comprising a core 825a. In between the two cores 824a, 825a is a telescopic sealing arrangement. The sealing arrangement comprises two outer seals 829b, extending spanwise from the first trailing edge segment core 824a towards the second trailing edge segment core 825a. The sealing arrangement also comprises two inner seals 829a, extending spanwise from the second trailing edge segment core 825a towards the first trailing edge segment core 824a. The inner seals 829a are located inside the outer seals 829b. The two pairs of seals can slide spanwise, past each other, with movement of the segments 824, 825.

Figure 8B:
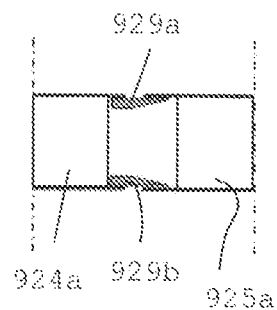
FIG. 8b shows a schematic aft view of a second sealing arrangement for use with the slat of FIG. 6 or 7.

FIG. 8b shows a schematic aft view of a blade sealing arrangement for use with the slat of FIG. 6 or 7. The figure shows a first trailing edge segment 924, comprising a core 924a, and a second trailing edge segment 925, also comprising a core 925a. Each trailing edge segment has flanges extending spanwise towards the other segment at upper and lower positions. In between the two cores 924a, 925a is a blade sealing arrangement. The sealing arrangement comprises a wedge shaped upper blade seal 929a attached to the upper flange of the first trailing edge segment 924 and extending spanwise past the end of the upper flange of the second trailing edge segment 925. The sealing arrangement also comprises a wedge shaped lower blade seal 929b attached to the lower flange of the first trailing edge segment 924 and extending spanwise past the end of the lower flange of the second trailing edge segment 925. The two seals can slide spanwise, past the relevant flange of the second segment 925, with movement of the segments 924, 925.

Figure 8C:
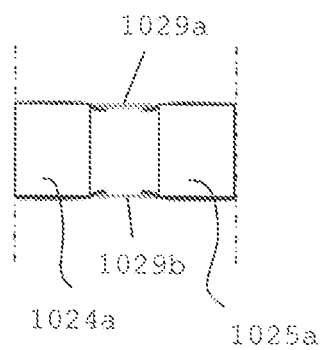
FIG. 8c shows a schematic aft view of a third sealing arrangement for use with the slat of FIG. 6 or 7.

FIG. 8c shows a schematic aft view of a compliant sealing arrangement for use with the slat of FIG. 6 or 7. The figure shows a first trailing edge segment 1024, comprising a core 1024a, and a second trailing edge segment 1025, also comprising a core 1025a. Each trailing edge segment has flanges extending spanwise towards the other segment at upper and lower positions. In between each of the two pairs of flanges is a compliant material seal. In between the upper flanges is an upper rubber seal 1029a extending between the two upper flanges. In between the lower flanges is a lower rubber seal 1029b extending between the two lower flanges. The two rubber seals are flexible so as expand and compress to accommodate relative movement of the segments 1024, 1025.

Figure 9:
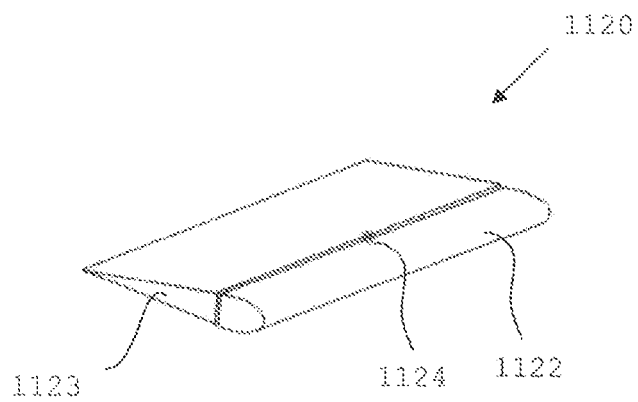
FIG. 9 shows a schematic perspective view of a slat according to a seventh embodiment of the invention.

FIG. 9 shows a schematic perspective view of a slat 1120 according to a seventh embodiment of the invention. The slat 1120 comprises a D-nose leading edge section 1122 and a wedge shaped trailing edge section 1123. The leading edge section 1122 also comprises an attachment structure (not shown) for attaching the slat 1120 to a wing primary structure.

The trailing edge section 1123 is a sandwich structure with a core sandwiched between two skins. The trailing edge section 1123 is a separate part to the leading edge section 1122 and is attached to the leading edge section 1122 by a spanwise sliding joint (or a flexible spanwise connection) arrangement. The arrangement includes a fixed datum point 1124 where the trailing edge section 1123 is fixed in relation to the leading edge section 1122. This datum point is located at the mid-span point of the slat 1120. The parts of the trailing edge section 1123 either side of the datum point 1124 can move spanwise with respect to the leading edge section 1122, during in-plane bending.

Figure 10:
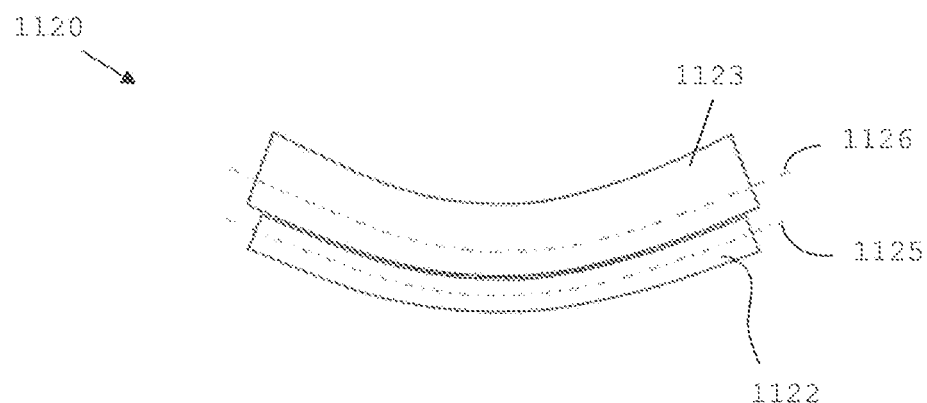
FIG. 10 shows a schematic plan view of a slat of FIG. 9.

FIG. 10 shows a schematic plan view of the slat 1120 of FIG. 9 during such in-plane bending. This Figure can readily be compared to FIG. 2e that shows in-plane bending where there is no spanwise sliding joint (or a flexible spanwise connection) arrangement.

Figure 2A:
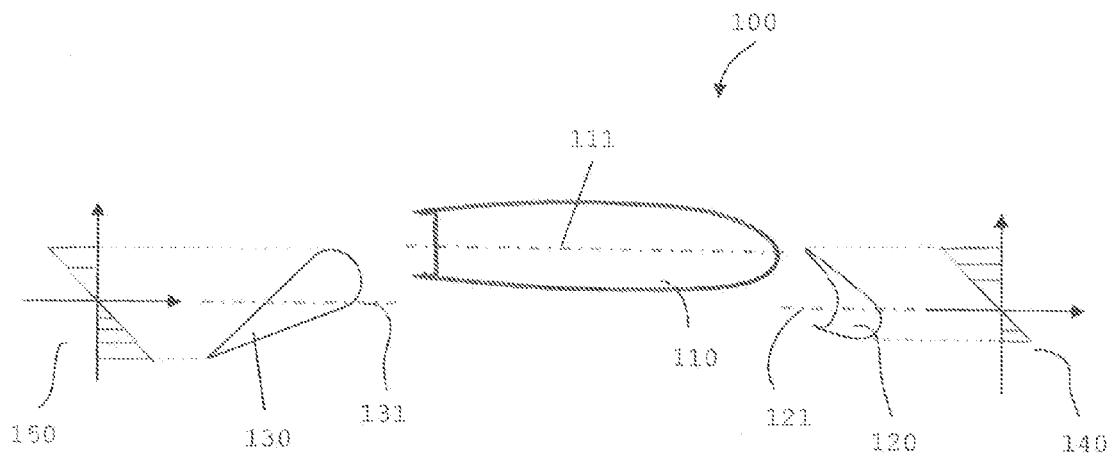
FIG. 2a shows a spanwise end view of the wing assembly of FIG. 1a with slat and flap deployed.
Figure 2B:
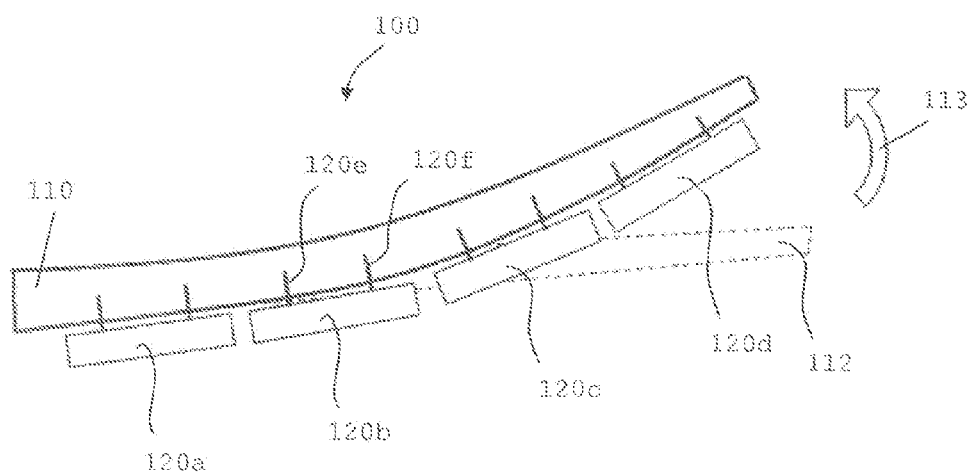
FIG. 2b shows an aft view of a typical wing assembly in an upwardly bent position.
Figure 2C:
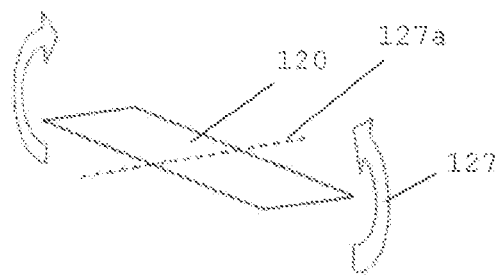
FIG. 2c shows a schematic perspective view of a slat experiencing out-of-plane spanwise bending.
Figure 2D:
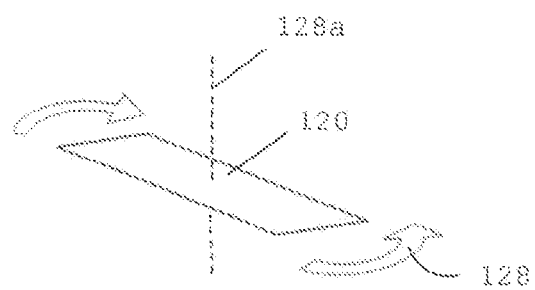
FIG. 2d shows a schematic perspective view of a slat experiencing in-plane bending.
Figure 2E:
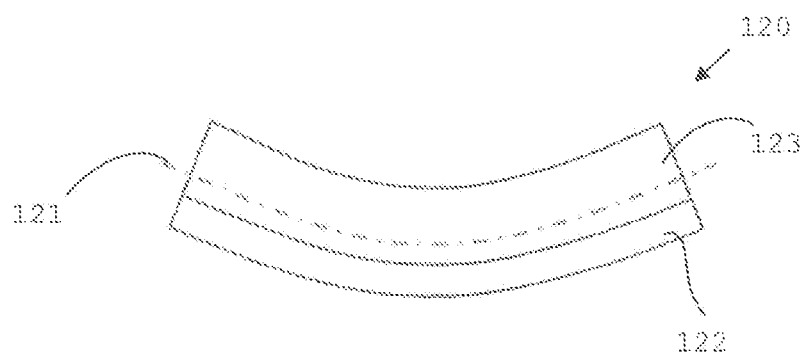
FIG. 2e shows a schematic plan view of the slat of FIG. 1b.
Figure 2F:
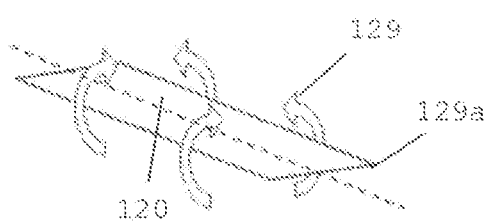
FIG. 2f shows a schematic perspective view of a slat experiencing out-of-plane chordwise bending.

Looking first at FIG. 2e, it is clear that the leading edge section 122 and the trailing edge section 123 are fixed in relation to each other along the spanwise length of the slat 120. Hence, during in-plane bending, the whole slat bends about major axis 121. The curvature resulting from the in-plane bending causes the leading edge of the leading edge section 122 to expand while the trailing edge of the leading edge section 122 wants to contract. Similarly, the leading edge of the trailing edge section 123 wants to expand while the trailing edge of the trailing edge section 123 contracts. As the trailing edge of the leading edge section 122 and the leading edge of the trailing edge section 123 are fixedly attached to each other, this causes the leading edge of the trailing edge section 123 to be forced to match the curvature of the trailing edge of the leading edge section 122 and therefore be constrained in length (when it wants to expand). It also causes the trailing edge of the leading edge section 122 to be forced to match the curvature of the leading edge of the trailing edge section 123 and therefore lengthen (when it wants to contract). This causes in-plane shear stresses in the slat 120 and associated shear loads that must be carried across a joint between the leading edge section and the trailing edge section.

On the other hand, in FIG. 10, as the leading edge section 1122 and the trailing edge section 1123 are separate and can slide spanwise in relation to each other, the trailing edge of the leading edge section 1122 can contract (as it wants to) and the leading edge of the trailing edge section 1123 can expand (as it wants to). This causes each section 1122, 1123 to bend about its own major axis 1125 and 1126, respectively. This results in the in-plane bending stiffness of the slat 1120 (as two independent parts) to be significantly less (typically less than half) than the slat 120 of FIG. 2e.

Figure 11:
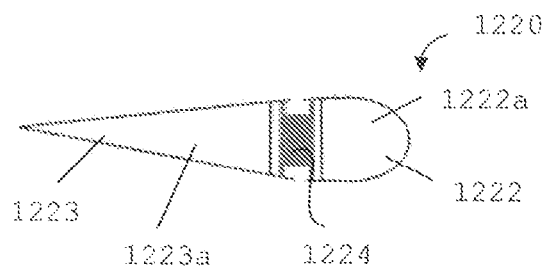
FIG. 11 shows a schematic spanwise end view of a first spanwise sliding joint arrangement for use with a slat, such as that of FIGS. 9 and 10.

FIG. 11 shows a schematic spanwise end view of a spanwise sliding joint arrangement for use with a slat 1220, such as that of FIGS. 9 and 10. The slat 1220 comprises a D-nose leading edge section 1222 and a wedge shaped trailing edge section 1223. The trailing edge section 1223 is a sandwich structure with a core 1223a sandwiched between two skins. Both leading 1222 and trailing 1223 edge sections comprise a core 1222a, 1223a respectively and upper and lower flanges extending chordwise towards the other section.

The trailing edge section 1223 is a separate part to the leading edge section 1222 and is attached to the leading edge section 1222 by a spanwise sliding joint arrangement 1224. The arrangement 1224 comprises a spanwise series of vertical H-links (only one shown in the Figure), with each of the four legs of the H-link being attached to one of the upper and lower flanges of the sections 1222, 1223. The arrangement 1224 includes a fixed datum point (not shown) where the trailing edge section 1223 is fixed in relation to the leading edge section 1222. This datum point is located at the mid-span point of the slat 1220.

Figure 12A:
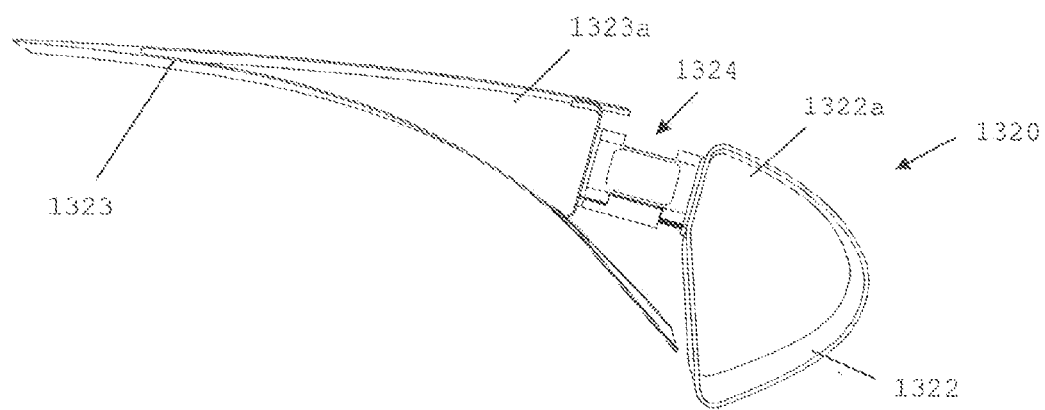
FIG. 12a shows a spanwise end view of a second spanwise sliding joint arrangement for use with a slat, such as that of FIGS. 9 and 10.
Figure 12B:
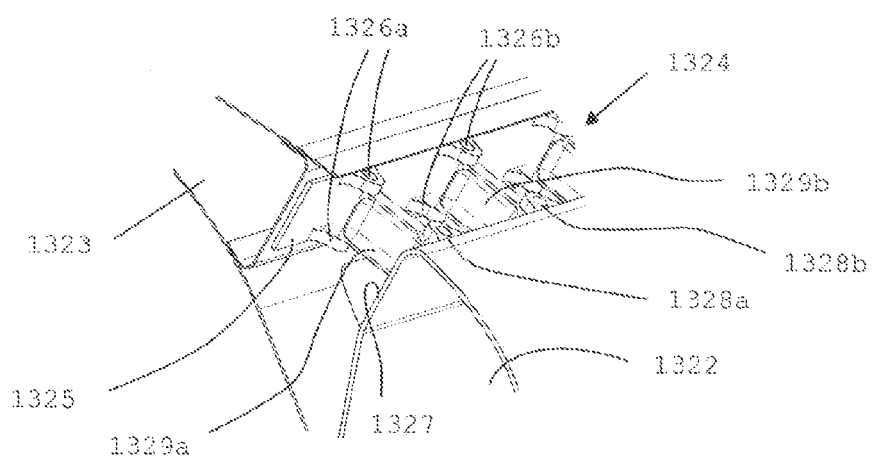

FIG. 12a shows a spanwise end view of a second spanwise sliding joint arrangement for use with a slat 1320, such as that of FIGS. 9 and 10. FIG. 12b shows a more detailed view of part of FIG. 12a. The slat 1320 comprises a D-nose leading edge section 1322 and a wedge shaped trailing edge section 1323. The trailing edge section 1323 is a sandwich structure with a core 1323a sandwiched between two skins. Both leading 1322 and trailing 1323 edge sections comprise a core 1322a, 1323a.

The trailing edge section 1323 is a separate part to the leading edge section 1322 and is attached to the leading edge section 1322 by a spanwise sliding joint arrangement 1324. The arrangement 1324 comprises a spanwise series of swinging links 1329a, 1329b, 1329c connected to both a plate 1325 on the leading face of the core 1323a of the trailing edge section 1323 and a plate 1327 on the trailing face of the core 1322a of the leading edge section 1322. Each rounded rectangular swinging link 1329a (and 1329b, 1329c) is pivotally mounted at two corners of a short side to a pair of pivot mountings 1326a (and 1326b, 1326c) on the trailing edge section plate 1325. Each swinging link 1329a (and 1329b, 1329c) is also pivotally mounted at the two corners of the other short side to a corresponding pair of pivot mountings 1328a (and 1328b, 1328c) on the leading edge section plate 1327. The rounded rectangular swinging links 1329a (and 1329b, 1329c) are partially hollowed out to reduce the weight of them.

The arrangement 1324 includes a fixed datum point (not shown) where the trailing edge section 1323 is fixed in relation to the leading edge section 1322. This datum point is located at the mid-span point of the slat.

Figure 13:
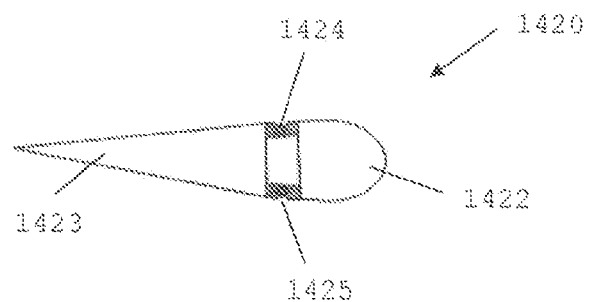
FIG. 13 shows a schematic spanwise end view of a third spanwise sliding joint arrangement for use with a slat, such as that of FIGS. 9 and 10.

FIG. 13 shows a schematic spanwise end view of a third spanwise sliding joint arrangement for use with a slat 1420, such as that of FIGS. 9 and 10. The slat 1420 comprises a D-nose leading edge section 1422 and a wedge shaped trailing edge section 1423. The trailing edge section 1423 is a sandwich structure with a core 1423a sandwiched between two skins. Both leading 1422 and trailing 1423 edge sections comprise a core 1423a and upper and lower flanges extending chordwise towards the other section.

The trailing edge section 1423 is a separate part to the leading edge section 1422 and is attached to the leading edge section 1422 by a spanwise sliding joint arrangement comprising a spanwise series of upper 1424 and lower 1425 piano hinges (only one of each shown in the Figure), with each of the upper/lower piano hinges 1424, 1425 being attached to the upper/lower flanges of the sections 1422, 1423. The arrangement includes a fixed datum point (not shown) where the trailing edge section 1423 is fixed in relation to the leading edge section 1422. This datum point is located at the mid-span point of the slat 1420.

Figure 14:
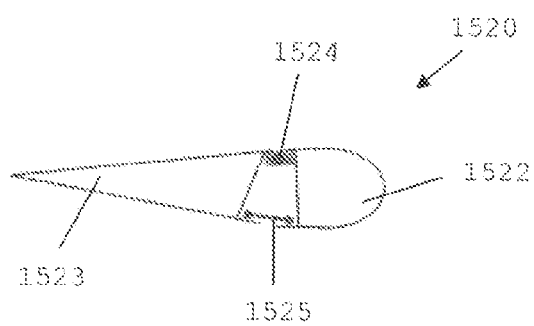
FIG. 14 shows a schematic spanwise end view of a fourth spanwise sliding joint arrangement for use with a slat, such as that of FIGS. 9 and 10.

FIG. 14 shows a schematic spanwise end view of a fourth spanwise sliding joint arrangement for use with a slat 1520, such as that of FIGS. 9 and 10. The slat 1520 comprises a D-nose leading edge section 1522 and a wedge shaped trailing edge section 1523. The trailing edge section 1523 is a sandwich structure with a core 1523a sandwiched between two skins. Both leading 1522 and trailing 1523 edge sections comprise a core 1523a and upper and lower flanges extending chordwise towards the other section.

The trailing edge section 1523 is a separate part to the leading edge section 1522 and is attached to the leading edge section 1522 by a spanwise sliding joint arrangement comprising a spanwise series of upper piano hinges 1524 (only one shown in the Figure) and lower swinging links 1525 (only one shown in the Figure). The upper piano hinges 1524 are attached to the upper flanges of the sections 1522, 1523. The lower swinging links 1525 are attached to the lower flanges of the sections 1522, 1523. The arrangement includes a fixed datum point (not shown) where the trailing edge section 1523 is fixed in relation to the leading edge section 1522. This datum point is located at the mid-span point of the slat 1520.

Figure 15:
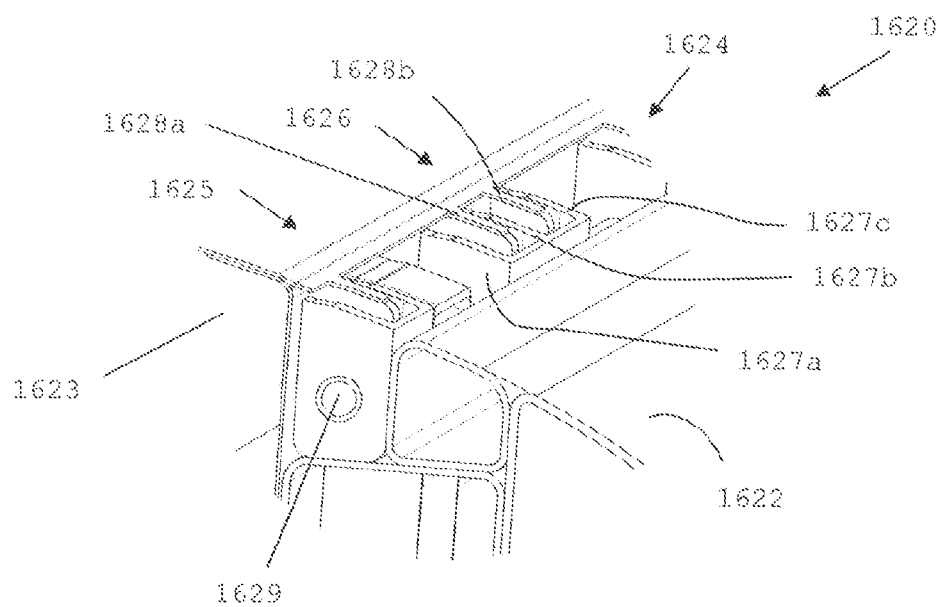
FIG. 15 shows a detailed view of a piano hinge for use with the spanwise sliding joint arrangement of FIG. 13 or 14.

FIG. 15 shows a detailed view of a piano hinge 1624 on a slat 1620, for use with the spanwise sliding joint arrangement of FIG. 13 or 14. The slat 1620 comprises a D-nose leading edge section 1622 and a wedge shaped trailing edge section 1623. The trailing edge section 1623 is a sandwich structure with a core sandwiched between two skins.

The trailing edge section 1623 is a separate part to the leading edge section 1622 and is attached to the leading edge section 1622 by a spanwise series of upper piano hinges 1625, 1626. Each piano hinge (looking here at hinge 1626) comprises a number of vertical lugs 1627a, 1627b, 1627c extending chordwise from the leading edge section 1622 towards the trailing edge section 1623 and a number of vertical lugs 1628a, 1628b extending chordwise from the trailing edge section 1623 towards the leading edge section 1622, connected together by way of a spanwise pin 1629, extending through holes in the lugs, to form a hinge. The lugs 1627a, 1627b, 1627c from the leading edge section 1622 alternate and interleave with the lugs 1628a, 1628b from the trailing edge section 1623. This allows limited relative spanwise movement of the leading 1622 and trailing 1623 edge sections, as the lugs 1627, 1628 slide along the spanwise pin 1629. In other words the sections 1622, 1623 can move spanwise in relation to each other to the extent that the lugs abut each other. Looking at FIG. 15, lug 1628a abuts against lug 1627b and lug 1628b abuts against lug 1627c. Hence, the trailing edge section 1623 cannot move any further spanwise with respect to the leading edge section 1622 "into the page". However, it can move spanwise with respect to the leading edge section 1622 "out of the page" until lug 1628a abuts against 1627a and lug 1628b abuts against lug 1627b.

The arrangement 1624 includes a fixed datum point (not shown) where the trailing edge section 1623 is fixed in relation to the leading edge section 1622. This datum point is located at the mid-span point of the slat 1620.

The "Detailed Description" above and FIG. 3 onwards, demonstrate ways that the in-plane bending stiffness in a slat (i.e. the major axis bending stiffness) can be reduced, making it possible to have longer slats with multiple support points (rather than a series of shorter slats that are simply supported in only two places). At the same time, the aerodynamic profile of the slat must be maintained and the slat must have the ability to carry aerodynamic loads to the support points without excessive deformation. In one example, a single slat could be used.

Figure 16:
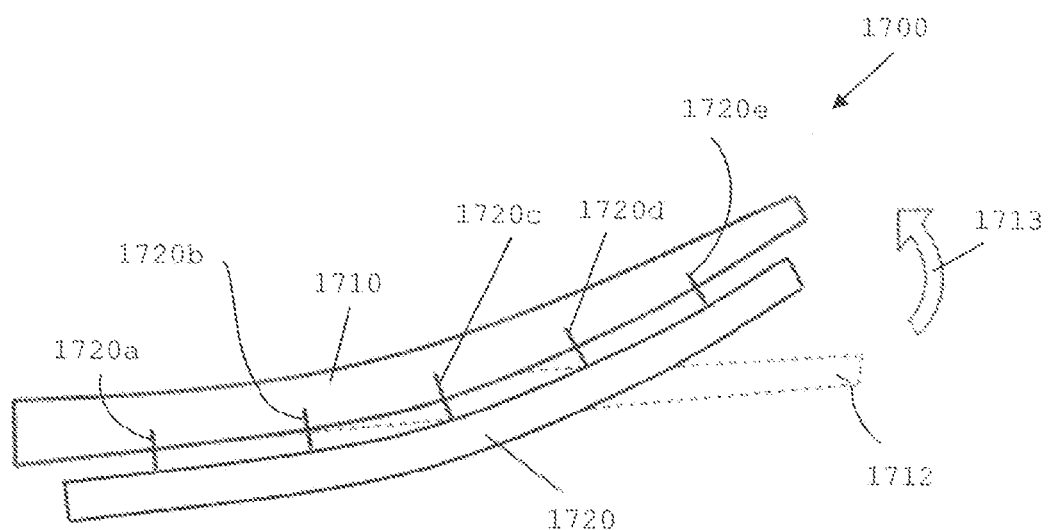
FIG. 16 shows an aft view of a wing assembly with a single slat in an upwardly bent position.

FIG. 16 shows an aft view of a wing assembly 1700 with such a single slat 1720, in an upwardly bent position, due to out-of-plane bending 1713. The undeformed position 1712 (in dashed lines) is also shown. The slat 1720 is attached to a wing primary structure 1710 by multiple driven tracks 1720a, 1720b, 1720c, 1720d, 1720e.

Figure 17:
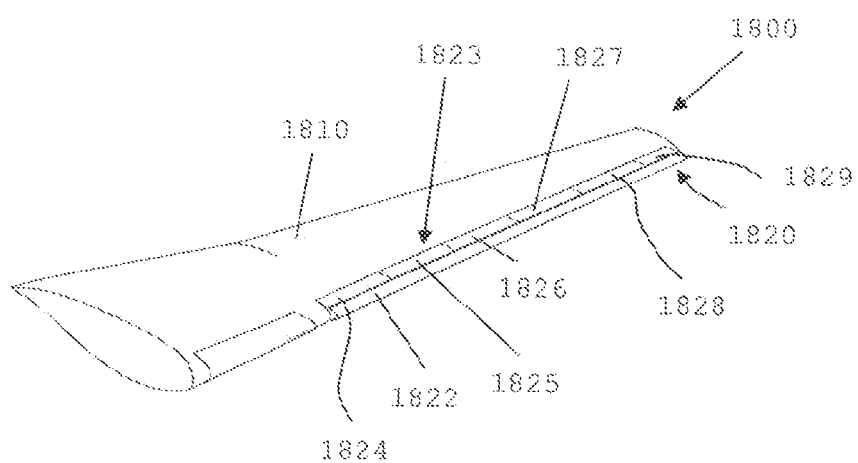
FIG. 17 shows a perspective view of a wing assembly including a slat according to a twelfth embodiment of the invention.

FIG. 17 shows a perspective view of a wing assembly 1800 including a slat 1820 according to a twelfth embodiment of the invention.

The slat 1820 is attached to a wing primary structure 1810 by multiple driven tracks (not shown). One central track carries the entire spanwise load of the slat 1820. The other tracks allow relative spanwise motion between the slat 1820 and the wing primary structure 1810 so as to prevent lateral loads being developed from the relative change in length under bending (as demonstrated by FIG. 10 in relation to two parts of a slat). The slat 1820 comprises a D-nose leading edge section 1822 and a wedge shaped trailing edge section 1823. It is the leading edge section 1822 that attaches the slat 1820 to the wing primary structure 1810.

The trailing edge section 1823 is a sandwich structure with a core sandwiched between two skins. The two skins have a lay-up (not shown) biased to have more fibres in the chordwise direction (like in FIG. 3) than the spanwise direction.

The trailing edge section 1823 is a separate part to the leading edge section 1822 and is attached to the leading edge section 1822 by a sliding joint arrangement (not shown, but like in any of FIG. 9, 10, 11, 12a, 12b, 13, 14 or 15).

The trailing edge section 1823 comprises a number of spanwise segments 1824, 1825, 1826, 1827, 1828, 1829 that are independently attached to the D-nose leading edge section 1822 (like in FIG. 6 or 7). There are also seals in between the segments (not shown, but like in any of FIG. 8a, 8b or 8c).

Hence, the embodiment of FIG. 17 uses a combination of ways of achieving a slat with a lower in-plane bending stiffness. These ways are: i) having material anisotropy (the skins being stiffer in the chordwise direction than the spanwise direction), ii) having a segmented trailing edge section 1823 and iii) having a sliding spanwise joint between the leading edge section 1822 and trailing edge section 1823.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above examples, the invention has been demonstrated in relation to a leading edge device, namely a slat. However, the invention is equally applicable to other leading edge devices, such as Krueger flap and also to trailing edge devices, such as ailerons, elevators, flaps, spoilers, and rudders. The invention also applies to leading and/or trailing edge devices, attached to a wing or a horizontal or vertical tailplane. In fact, the invention is applicable to any aerodynamic device (for example a high lift device or control surface) that is deployed (for example, by translation, rotation, or a combination of those movements) or located away from the bending axis of the primary structure it is attached to.

Referring to FIG. 3, the bias of the fibres towards the chordwise direction could be achieved (in addition to or instead of using biased fibre orientations), by using a combination of fibre materials, of differing stiffnesses, with the stiffer fibres being orientated in the chordwise direction.

Referring to FIG. 5b, any suitable compliant material may be used, not necessarily rubber. Also, the compliant material may just cover (i.e. not necessarily fill) the slots.

Referring to FIGS. 6 and 7, interleaving segments or surfaces could be used instead of seals.

Referring to FIG. 8, any other suitable sealing arrangement could be used. Also, any suitable compliant material may be used, not necessarily rubber.

Referring to FIGS. 9, 10, 11, 12a, 12b, 13, 14 and 15, any suitable spanwise sliding joint (or flexible spanwise connection) arrangement may be used. For example, swinging bolts, piano hinges, swinging linkages etc., or any suitable combination.

Referring to FIG. 16, a slat may instead run only from an engine pylon to a wing tip and/or a second slat may run from a wing root to the, or another engine pylon, rather than a single slat running the whole required wing length.

Referring to FIG. 17, the embodiment shown uses a combination of three ways of achieving a slat with a lower in-plane bending stiffness. However, any combination of different ways may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aerodynamic device, wherein the device is a leading edge device configured for use as a leading edge device of a wing, horizontal tailplane or vertical tailplane structure of an aircraft, the aerodynamic device having:
   a spanwise length,
   a chordwise width,
   a leading edge section along a leading edge of the device, for being mounted to the wing, horizontal tailplane or vertical tailplane of the aircraft, and
   a trailing edge section along a trailing edge of the device, for providing a required aerodynamic profile,
   wherein a first chordwise extending segment of the trailing edge section is moveable in a spanwise direction with respect to the leading edge section or with respect to a second chordwise extending segment of the trailing edge section.

2. An aerodynamic device as claimed in claim 1, wherein the trailing edge section comprises one or more slots extending chordwise from the trailing edge of the device, thus defining two or more chordwise extending segments along the spanwise length of the trailing edge section.

3. An aerodynamic device as claimed in claim 2, wherein the one or more slots open and close during in-plane bending of the device.

4. An aerodynamic device as claimed in claim 2, wherein the slots are aerodynamically sealed such that the required aerodynamic profile is maintained.

5. An aerodynamic device as claimed in claim 4, wherein the aerodynamic sealing comprises covering the slots or filling the slots with a flexible material.

6. An aerodynamic device as claimed in claim 5, wherein the flexible material is rubber.

7. An aerodynamic device as claimed in claim 1, wherein the trailing edge section comprises at least two chordwise extending segments, each segment being independently attached to the leading edge section.

8. An aerodynamic device as claimed in claim 7, wherein the segments move spanwise with respect to each other during in-plane bending of the device.

9. An aerodynamic device as claimed in claim 7, wherein the segments are aerodynamically sealed to each other such that the required aerodynamic profile is maintained.

10. An aerodynamic device as claimed in claim 9, wherein the aerodynamic sealing comprises seals.

11. An aerodynamic device as claimed in claim 10, wherein the seals are telescopic seals, blade seals or flexible seals between the segments.

12. An aerodynamic device as claimed in claim 9, wherein the aerodynamic sealing comprises interleaving of the seals/segments.

13. An aerodynamic device as claimed in claim 1, wherein the trailing edge section is slidably mounted to the leading edge section such that points on the trailing edge section can move spanwise with respect to corresponding points on the leading edge section.

14. An aerodynamic device as claimed in claim 13, wherein spanwise sliding between the trailing edge section and leading edge section is not permitted at a substantially mid-span point, by provision of a fixing between the trailing edge section and leading edge section at that point.

15. An aerodynamic device as claimed in claim 13, wherein the slidable mounting is provided by any of the following: swinging linkages, piano hinges, sliding bolts or a combination of these.

16. An aerodynamic device as claimed in claim 1, wherein the leading edge section comprises a D-nose structure.

17. An aerodynamic device as claimed in claim 1, wherein the device is made of composite material and/or a metallic alloy.

18. An aerodynamic device as claimed in claim 17, wherein the composite material is a synthetic composite material.

19. An aerodynamic device as claimed in claim 18, wherein the synthetic composite material is a carbon fibre composite material.

20. An aerodynamic device as claimed in claim 17, wherein metallic alloy is an aluminium alloy.

21. An aerodynamic device as claimed in claim 1, wherein the aerodynamic device is a slat or a Krueger flap.

22. An aerodynamic device as claimed in claim 1, wherein the aerodynamic device is a slat suitable for being rotatably mounted to a leading edge of a wing of an aircraft.

23. An aircraft wing comprising a slat as claimed in claim 22.

24. An aircraft comprising a wing, horizontal tailplane or vertical tailplane, the aerodynamic device as claimed in claim 1 being mounted to the wing, horizontal tailplane or vertical tailplane.

* * * * *